US010025357B2

(12) United States Patent
Davis et al.

(10) Patent No.: US 10,025,357 B2
(45) Date of Patent: Jul. 17, 2018

(54) ENCLOSURE SYSTEM FOR COMPUTING EQUIPMENT

(71) Applicant: Seagate Technology LLC, Cupertino, CA (US)

(72) Inventors: David Michael Davis, Portsmouth (GB); Odie Killen, Colorado Springs, CO (US); Alexander Carl Worrall, Waterlooville (GB)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/740,081

(22) Filed: Jun. 15, 2015

(65) Prior Publication Data
US 2016/0363966 A1    Dec. 15, 2016

(51) Int. Cl.
| | |
|---|---|
| *G06F 1/16* | (2006.01) |
| *G11B 33/12* | (2006.01) |
| *G06F 1/18* | (2006.01) |
| *G06F 1/20* | (2006.01) |
| *G11B 33/00* | (2006.01) |

(52) U.S. Cl.
CPC ............... *G06F 1/187* (2013.01); *G06F 1/20* (2013.01); *G11B 33/00* (2013.01); *G11B 33/128* (2013.01)

(58) Field of Classification Search
CPC ............................. G06F 1/187; G11B 33/128
See application file for complete search history.

(56) References Cited

U.S. PATENT DOCUMENTS

| | | | | |
|---|---|---|---|---|
| 5,506,750 A | * | 4/1996 | Carteau ............. | G11B 33/128 361/679.32 |
| 6,075,694 A | * | 6/2000 | Mills ................. | H05K 7/1424 312/223.2 |
| 6,122,173 A | * | 9/2000 | Felcman ............. | G06F 1/16 312/223.1 |
| 6,137,684 A | * | 10/2000 | Ayd ................... | H05K 7/1411 361/608 |
| 6,466,449 B1 | * | 10/2002 | Sheen ................ | G06F 1/184 206/707 |
| 6,611,424 B2 | * | 8/2003 | Huang ............... | H05K 7/1421 248/224.51 |

(Continued)

OTHER PUBLICATIONS

Author Unknown, "Storage Bridge Bay Working Group," Storage Bridge Bay Working Group, Inc., [retrieved on Jun. 3, 2015], 2 pages, retrieved from: http://www.sbbwg.org/home/.

(Continued)

*Primary Examiner* — Adrian S Wilson
(74) *Attorney, Agent, or Firm* — Holzer Patel Drennan (57) ABSTRACT

The disclosed technology provides an enclosure system for computing equipment and a method for manufacturing an enclosure system, which includes a front enclosure base configured to secure a plurality of tray modules, each of the plurality of tray modules comprising a printed circuit board to connect a plurality of electronic components and being connected at a rear end to a connectivity midplane. The front enclosure base has a front end taller than the rear end such that the front end is configured to structurally support the plurality of tray modules and the rear end allows connecting rear faces of each of the plurality of tray modules to the connectivity midplane.

19 Claims, 6 Drawing Sheets

(56) References Cited

U.S. PATENT DOCUMENTS

| | | | | |
|---|---|---|---|---|
| 6,754,082 B1* | 6/2004 | Ding | G11B 33/02 | 312/223.1 |
| 6,856,508 B2* | 2/2005 | Rabinovitz | G06F 1/184 | 248/682 |
| 6,906,918 B2 | 6/2005 | Rabinovitz | | |
| 7,200,003 B2* | 4/2007 | Hood | G06F 1/181 | 312/223.1 |
| 7,362,565 B2* | 4/2008 | Imblum | G06F 1/184 | 361/679.33 |
| 7,591,056 B2* | 9/2009 | Mimlitch | H05K 7/186 | 29/401.1 |
| 7,733,640 B2* | 6/2010 | Huang | G11B 33/127 | 361/679.33 |
| 7,821,790 B2 | 10/2010 | Sharma et al. | | |
| 7,864,539 B2* | 1/2011 | Dunham | G06F 1/187 | 312/223.1 |
| 7,894,195 B2* | 2/2011 | Lin | G06F 1/184 | 361/727 |
| 8,508,928 B2 | 8/2013 | Killen et al. | | |
| 8,582,299 B1* | 11/2013 | Phillips | H05K 7/1489 | 361/724 |
| 9,001,514 B2* | 4/2015 | Rust | H05K 7/02 | 361/727 |
| 2004/0120123 A1* | 6/2004 | Mayer | H05K 7/1489 | 361/725 |
| 2005/0281014 A1* | 12/2005 | Carullo | H05K 7/20563 | 361/796 |
| 2007/0115627 A1* | 5/2007 | Carlisi | G06F 1/183 | 361/679.01 |
| 2007/0121283 A1* | 5/2007 | Lai | G06F 1/183 | 361/679.02 |
| 2007/0230111 A1* | 10/2007 | Starr | G11B 33/125 | 361/679.31 |
| 2008/0037218 A1* | 2/2008 | Sharma | H05K 7/1424 | 361/695 |
| 2008/0062667 A1* | 3/2008 | Campini | G06F 1/181 | 361/797 |
| 2009/0097200 A1* | 4/2009 | Sharma | G06F 1/18 | 361/688 |
| 2010/0265645 A1* | 10/2010 | Wang | G06F 1/183 | 361/679.4 |
| 2012/0036322 A1* | 2/2012 | Klein | G06F 1/187 | 711/114 |
| 2013/0050955 A1* | 2/2013 | Shinsato | G06F 1/181 | 361/727 |
| 2013/0265725 A1 | 10/2013 | Harvilchuck | | |
| 2014/0203696 A1* | 7/2014 | Rust | G11B 33/02 | 312/330.1 |
| 2015/0355686 A1* | 12/2015 | Heyd | G06F 1/187 | 361/679.31 |

OTHER PUBLICATIONS

Author Unknown, "Server System Infrastructure (SSI) Forum," SSI Forum, [retrieved on Jun. 3, 2015], 1 page, retrieved from: https://ssiforum.org.

* cited by examiner

ENCLOSURE SYSTEM FOR COMPUTING EQUIPMENT

SUMMARY

Certain embodiments of the present disclosure include an enclosure system and a method for manufacturing an enclosure system, which includes a front enclosure base configured to secure a plurality of tray modules, each of the plurality of tray modules comprising a printed circuit board to connect a plurality of electronic components and being connected at a rear end to a connectivity midplane. The front enclosure base has a front end taller than the rear end such that the front end is configured to structurally supports the plurality of tray modules and the rear end allows connecting rear faces of each of the plurality of tray modules to the connectivity midplane.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following more particular written Detailed Description of various implementations as further illustrated in the accompanying drawings and defined in the appended claims.

These and various other features and advantages will be apparent from a reading of the following Detailed Description.

DETAILED DESCRIPTIONS

A storage device enclosure in some embodiments is a specialized casing that protects (and optionally seals) internal components of the storage device while providing a mechanism to provide power to the storage device and allows the storage device to communicate with one or more connected external computing systems. In implementations where the internal components of the storage device include one or more spinning storage media or platters (e.g., magnetic or optical media), the storage device enclosure can protect the media from damage from an external environment (e.g., contaminants, impacts, moisture, etc.). Such example storage media include hard disc drives, digital optical disc drives, or any other spinning circular storage media drives. Structural support for data storage devices that are placed in the enclosure for a high density application is also an important aspect of certain embodiments of the present application.

Increasing storage capacity in disc drives has been achieved by increasing areal density, which has been achieved by incrementally improving head, media, and channel technology. Due to packaging requirements, outside dimensions of disc drives are predefined based on industry standard sizes (e.g., "5.25-inch" or 146.05 mm×204.72 mm×82.55 mm (Small Form Factor (SFF)-8501), "3.5 inch" or 101.6 mm×147 mm×26.1 (SFF-8301), "2.5-inch" or 69.85 mm×100.45 mm×9.5 mm (SFF-8201), etc.). These industry standard sizes are not easily changed, and versatility to accommodate different components is desirable.

Re-use of components and modules is important in keeping development and product costs down. Costs are also reduced as the volumes of the same component used across the range of products are increased, reducing the piece part set-up, tooling, and amortization costs. This disclosure provides a configurable enclosure system for various computing equipment. The enclosure system includes a front base enclosure, compatible with a variety of covers, rear configurations, and side panels. This approach allows a common tray system to be used within the front of the enclosure, while allowing enclosure variants, with modularity in the rear of the enclosure, to create a family of products to address different markets. Although the following descriptions are tailored to example existing industry sizes, the example configurable enclosure systems can be sized to fit various dimensions in a variety of applications.

Figure 1A:
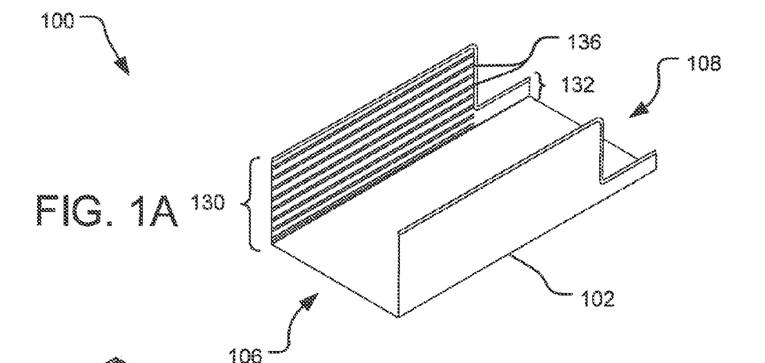
FIG. 1A illustrates a perspective view of an example front enclosure base for the disclosed enclosure system.
Figure 1B:
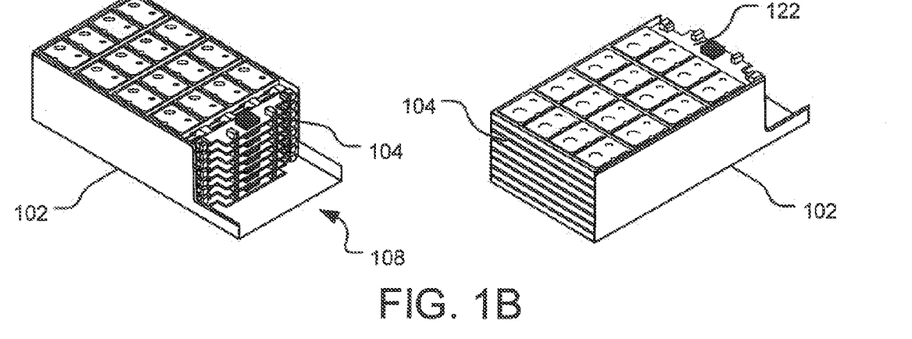
FIG. 1B illustrates two perspective views of tray modules assembled in the front enclosure base of FIG. 1A.
Figure 1C:
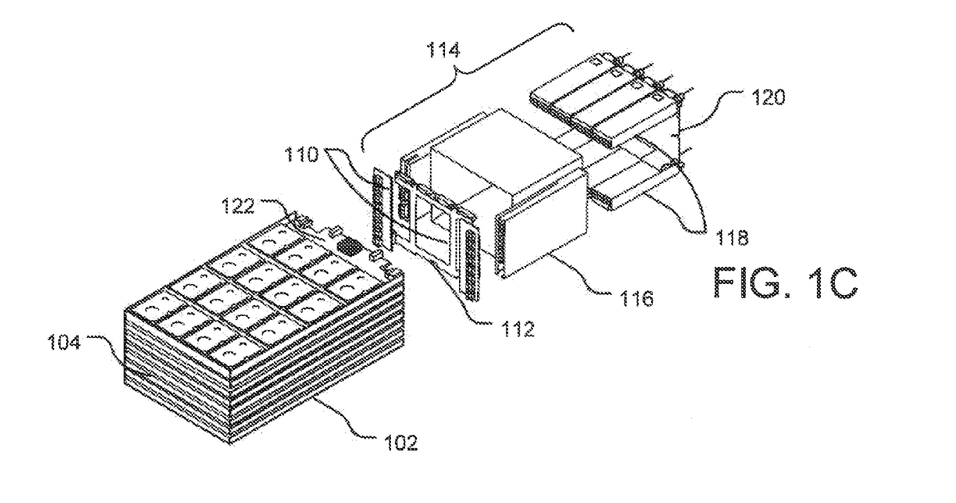
FIG. 1C illustrates an exploded perspective view of components incorporated in the disclosed enclosure system.

FIG. 1A is a perspective view of an example front enclosure base 102 for the enclosure system 100 in the disclosed technology. FIG. 1B illustrates two perspective views of tray modules (e.g., tray modules 104) assembled in the front enclosure base 102 of FIG. 1A. FIG. 1C is an exploded perspective view of the components incorporated in the enclosure system 100.

The front enclosure base 102 shown in FIG. 1A can include racks or rail runners 136 within which tray modules (e.g., tray modules 104, see FIG. 1B) can be arranged individually or in stacks in the vertical direction and in arrays in the horizontal plane within the front enclosure base 102. The tray modules 104 containing stacks of disk drives are arranged with no intervening structure between each stack permitting air travel through and between the stacks. In other implementations, the front enclosure base 102 can include components for attaching and/or detaching rail runners 136. For example, the use of an increased height tray may require removal of rail runners 136 in slots above the rail runners 136 used to provide additional height.

The measurements for the front enclosure base 102 and the tray modules 104 can vary. In some implementations, the height 130 is such that when an appropriate cover is added, the enclosure system 100 is about 6 U high (266.7 mm). In one implementation, the front enclosure base 102 can be about a 32.7 mm pitch (i.e., the distance between each set of rail runners 136) and about a 754 mm maximum length. For example, a 32.7 mm pitch allows eight trays to be fitted into 6 U and allows space for the chassis structure (32.7×8=261.6 mm-5.1 mm for structure and rack support). In one implementation, the tray modules hold about 16 data storage drives in a largest-side down orientation and the front enclosure base secures about 8 tray modules.

The front enclosure base 102 shown in FIG. 1A can be sized to fit the width of an industry standard rack (e.g., 19-inch rack mount (EIA310D)) to secure the tray modules 104. The tray modules 104 have substantially the same width as a front end 106 to the front enclosure base 102. In one implementation, the tray modules 104 are less about 6-10 mm to allow for varying metal thicknesses and runner systems, etc. Or, in another implementation, the tray modules 104 are about 4 mm less than the front enclosure base 102 or chassis base width, allowing for about 2 mm thickness of the front enclosure base 102 or chassis base.

As shown in FIG. 1A, the front enclosure base 102 has a front end 106 taller than the rear end 108, in a step formation. In other words, the height 130 of the front end 106 is more than a height 132 of the read end 108. This configuration provides support at the front end 106 for tray modules 104 (see FIG. 1B) and then allows the rear end 108 to connect rear faces of each of the tray modules 104 to a connectivity midplane 110 (shown in FIG. 1C). In this implementation, the tray modules 104 include a plurality of 3.5-inch drives with interface printed circuit board (PCB) assemblies (e.g., interface PCB 122, see FIGS. 1B and 1C).

A tray system comprising the tray modules 104 in the disclosed technology can house tray heights of single or multiple units (e.g., a single height tray, a double height tray, a triple height tray, etc.). For example, larger items can be used on a single tray. Or, in another example, if the enclosure can support a tray power of X and the server requires a tray power of 2×, a double height tray can be used. The tray modules 104 include, but are not limited to, disk drives, data processing housing, data storage or data switching elements, and combinations of these devices. The tray system maintains the power, signal and location requirements for its interface into the main chassis.

A number of electronic modules, such as input/output (I/O) modules, interconnect modules, cooling modules, interconnecting planes with appropriate sockets and/or cabling, and other electronic modules may be provided within the front enclosure base 102. The tray modules 104 connect at the rear end 108 of the front enclosure base 102 to a connectivity midplane, which can include a signal midplane 110 (including left-hand signal circuitry and right-hand signal circuitry), and a power busbar/midplane 112, as shown in FIG. 1C. The front end 106 of the front end base 102 is taller than the rear end 108 such that the front end 106 supports the tray modules 104 and the rear end 108 allows connecting rear faces of each of the tray modules 104 to the connectivity midplanes 110 and 112.

The signal midplane 110 connects to components of a rear sub-chassis assembly 114, which can include a controller 116, power supplies/battery modules 118, fan modules (not shown) and a fan control PCB 120, for example, as shown in FIG. 1C.

Figure 2:
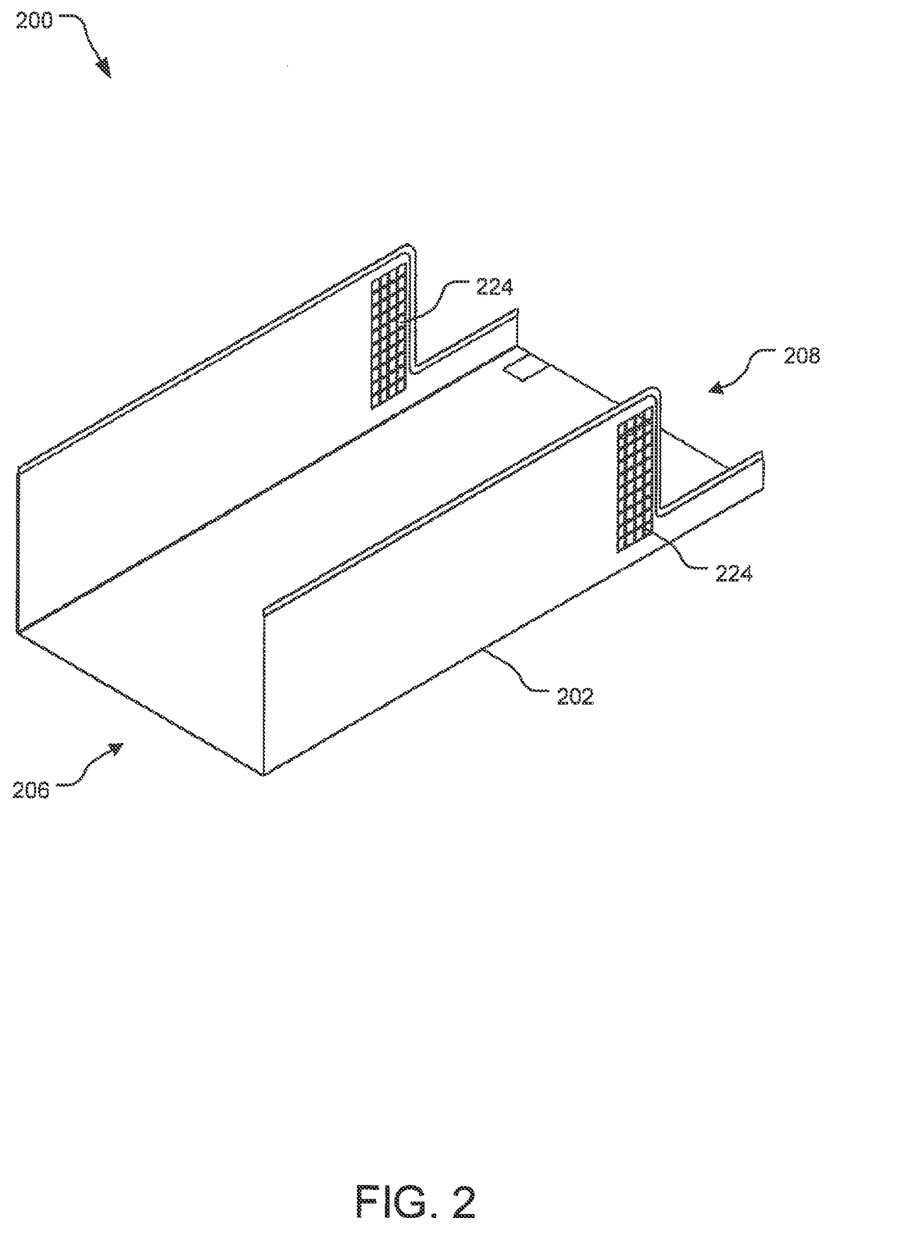
FIG. 2 illustrates a perspective view of a second example front enclosure base with airflow grills.

FIG. 2 is a perspective view of a second example front enclosure base 202 in an enclosure system 200. This figure illustrates that some front enclosure bases can have additional features incorporated within the front enclosure base. In this implementation, the sides of the front enclosure base 202 have airflow inlets or vents 224. As the demand for space to store larger amounts of data increases, the capacities of data storage media and the densities with which they are packed within a data storage system increase. The increase in capacities and densities means that the power consumption of a data storage system and the amount of heat generated within the system also increase.

Airflow generating means provided within the front enclosure base 202 generates a horizontal airflow so that, when the tray modules (not shown) are received in the front enclosure base 202, the trays including a plurality of storage devices (e.g., disk drives) are cooled by the passing horizontal airflow, and vented via the airflow vents 224 of the front enclosure 202. The airflow generating means is in the rear sub-assembly of the chassis, and attached to front enclosure base 202. In some implementations, side covers or cheeks may be attached to the front enclosure base 202 (see side covers 530 in FIG. 5A-C). Controllers placed in the side covers are cooled by the same airflow generating means as the rest of the enclosure system 200, however, air exits the controller through a top vent close to its connector system (not shown) and enters the chassis via the air vents 224. From there the airflow is combined with airflow from over the tray modules and passes into the system airflow generating means and out to the rear of the enclosure system 200.

The use of such a system enables a large number of disk drives to be housed within each tray, while enabling easy access to individual drives should one need servicing or changing. The implementation of the front enclosure base 202 is configured to have the airflow vents 224 near a back end 208. However, alternatively, such airflow vents 224 may be located at alternative locations along the length of the front enclosure base 202.

The disclosed front enclosure bases can be incorporated in a variety of applications. FIGS. 3A-C, 4A-C, and 5A-C illustrate three different enclosure system chassis implementations incorporating the front enclosure bases disclosed herein.

Figure 3A:
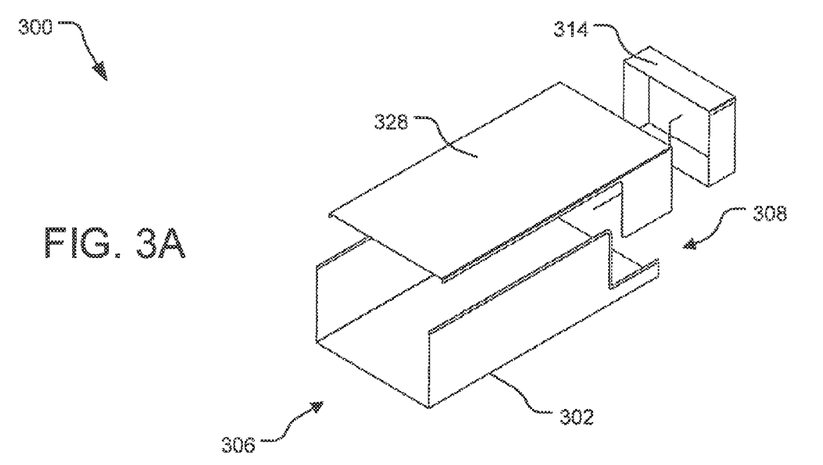
FIG. 3A illustrates an example exploded perspective view of a first chassis.
Figure 3B:
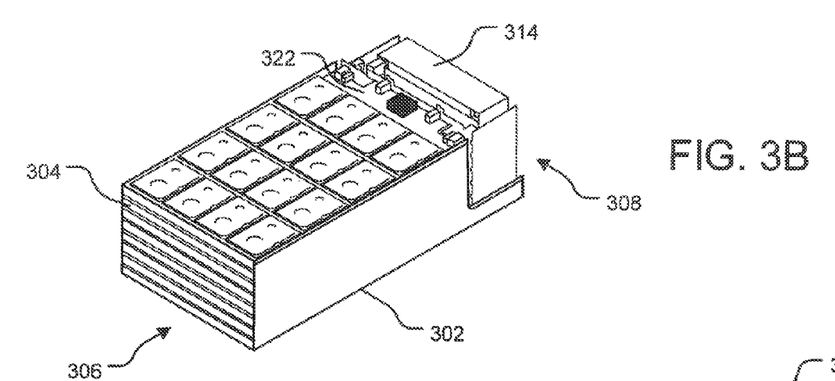
FIG. 3B illustrates an example assembled first chassis.
Figure 3C:
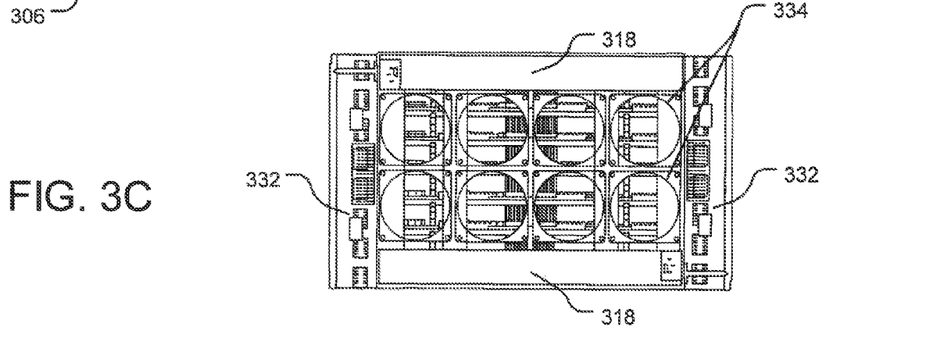
FIG. 3C illustrates an example rear view of an assembled first chassis.

FIG. 3A illustrates an example exploded perspective view of enclosures for a chassis 300. FIG. 3B illustrates an example perspective view of the chassis 300 including a plurality of storage device trays. FIG. 3C illustrates an example rear view of the assembled chassis 300.

The chassis 300 may be used for a lower performance, lower power cloud-type environment. The chassis 300 illustrates a shorter module (lengthwise), which allows for a much shorter enclosure to be created around the same base. Since the tray solution in this implementation is the same as in the example chasses in FIGS. 4A-4C and 5A-5C, any variation in length is accommodated in the rear portion of the chassis.

As shown in FIG. 3A, the front enclosure base 302 has a front end 306 taller than the rear end 308, in a step formation. This configuration provides support at the front end 306 for tray modules 304 (shown in FIG. 3B) and then allows the rear end 308 to connect rear faces of each of the tray modules 304 to a connectivity midplane (not shown). In this implementation, the tray modules 304 include a plurality of 3.5-inch drives with interface printed circuit board (PCB) assemblies (e.g., interface PCB 322), as shown in FIG. 3B.

This implementation can be approximately 6 U high, and includes a 19-inch rack mount. The chassis 300 has an about 900 mm length (as compared to an 1100 mm chassis length described in FIG. 4) so that it can be used in 1000 mm deep racks which are widely used within the industry. The shorter length is primarily achieved by a shorter I/O module and a change of orientation of the power system. While this limits the power available to the enclosure, the power is sufficient for the cloud market. The enclosure can accommodate eight fan modules 334, up to two 1.2/1.4 KW PSUs 318, dual I/O modules (see I/O modules 332 in FIG. 3C), and eight multiple function tray modules 304 (shown in FIG. 3B) in the front (e.g., HDD, SSD, Microserver, Switches, etc.). The top cover 328 and rear sub-chassis assembly 314 connect to the common front enclosure base 302 to provide a contiguous chassis structure. Cooling modules and power are secure within the rear sub-chassis assembly 314, with I/O modules 332 (shown in FIG. 3C) at the sides.

In this implementation, the controller (not shown) requires airflow management due to its shorter length. The lower power of this 900 mm chassis implementation allows for thinner and larger fan options. The airflow path can move under the controller PCB 322 with a return path to a top vent (not shown). The power supply units (PSUs) 318 (e.g., two PSUs providing non-redundant power for full operation) pull air from, and return air to, the rear enclosure plenum. This mechanism removes the potential of the pressure delta stalling the PSU fan. The PSU airflow is then removed by the main system fans. In one implementation, if warm storage is assumed, all drives are spinning with some driving active, lower controller utilization, and reduced fan power in line with a reduced load. As FIG. 3C shows the chassis assembled from a rear view, trays, midplanes and a busbar are visible through the fans 334. The fan blades are not shown.

Figure 4A:
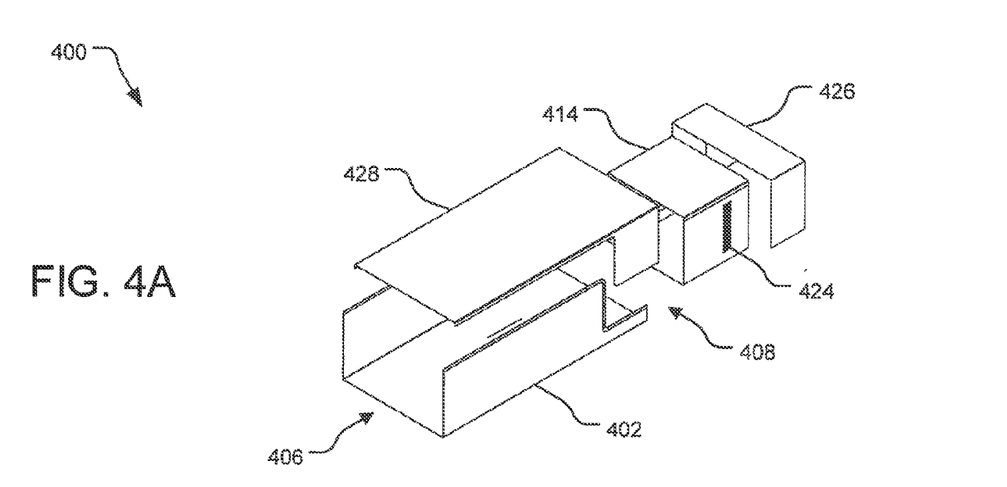
FIG. 4A illustrates an example exploded perspective view of a second chassis.
Figure 4B:
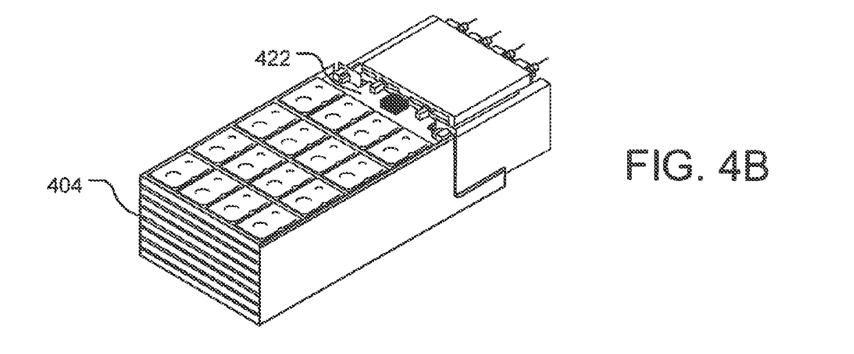
FIG. 4B illustrates an example assembled second chassis.
Figure 4C:
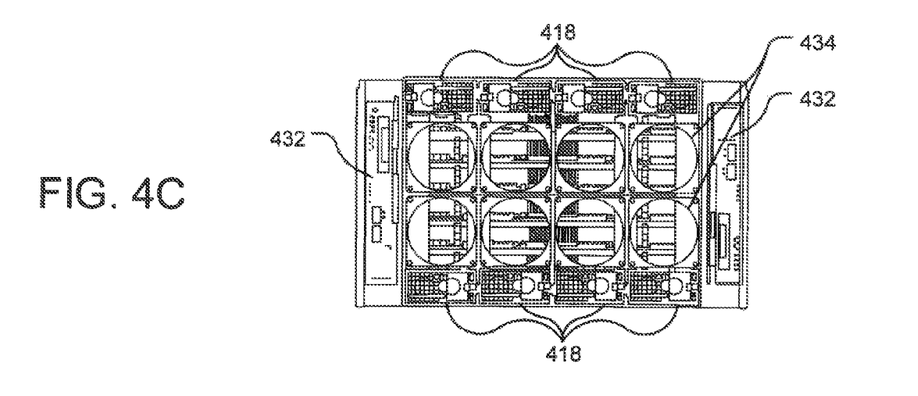
FIG. 4C illustrates an example rear view of an assembled second chassis.

FIG. 4A illustrates an example exploded perspective view of a second chassis 400. FIG. 4B illustrates an example assembled second chassis 400. FIG. 4C illustrates a rear view of the example assembled second chassis. As shown in FIG. 4A, the front enclosure base 402 has a front end 406 taller than the rear end 408, in a step formation. This configuration provides support at the front end 406 for tray modules 404 (shown in FIG. 4B) and then allows the rear end 408 to connect rear faces of each of the tray modules 404 to a connectivity midplane (not shown).

In this implementation, a rear sub-chassis assembly 414, rear extension cover 426, and a top cover 428, are added to the front enclosure base 402 to provide for an about 1100 mm chassis variant. The top cover 428 and rear extension cover 426 connect to the front enclosure base 402 to provide a contiguous chassis structure. The top cover 428 connects the top perimeter of the front end base 402 on the front end 406 and the back end 408. These additional components improve performance and usability of the enclosure system.

This implementation can be approximately 6 U high, and includes a 19-inch rack mount. The top cover 428 and rear sub-chassis assembly 414 connect to the common front enclosure base 402 to provide a contiguous chassis structure. The enclosure can accommodate eight fan modules 434 (shown in FIG. 4C), up to eight 1.2/1.4 KW PSUs 418 (shown in FIG. 4C), dual I/O modules (see I/O modules 432 in FIG. 4C), and eight multiple function tray modules 404 in the front (e.g., HDD, SSD, Microserver, Switches, etc.). Cooling modules and power can be located within the rear sub-chassis assembly 414. The module locations for the PSUs 418 could also be used for batteries for the enclosure system. For example, four PSU modules and four battery modules could be used in the eight module locations.

In one implementation, there may be dual signal midplanes and a power busbar/midplane for back end connectivity (not shown). An air vent 424 incorporated in the chassis 400, as shown in FIG. 4A, corresponds with a top vent of the I/O modules 432, shown in FIG. 4C.

The airflow for the implementation described in FIGS. 4A and 4B enters at the front of the front enclosure base 402. Airflow cools any interface silicon on the tray interface PCB 422. The airflow path can split, and pass through the power busbar/midplane (not shown) to the fans 434, shown in FIG. 4C. Other airflow passes between the signal midplanes and power busbars, and into the controllers. Air exits the controller by the top vent and into the fan modules. Airflow control ducts may be required in the controller due to its constrained length in relation to the fans. As FIG. 4C shows the chassis assembled from a rear view, trays, midplanes and a busbar are visible through the fans 434. The fan blades are not shown.

Figure 5A:
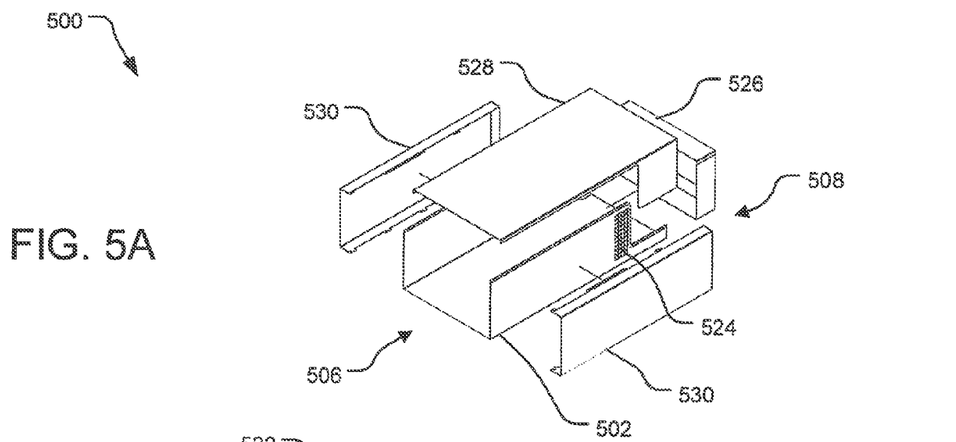
FIG. 5A illustrates an example exploded perspective view of a third chassis.
Figure 5B:
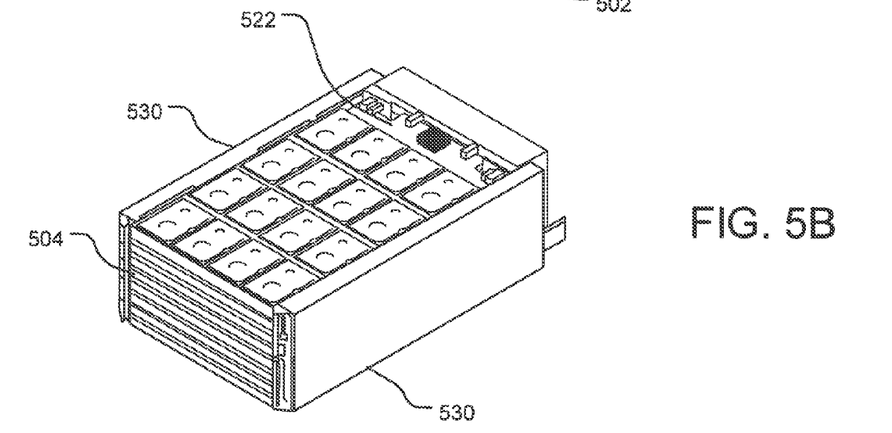
FIG. 5B illustrates an example assembled third chassis.
Figure 5C:
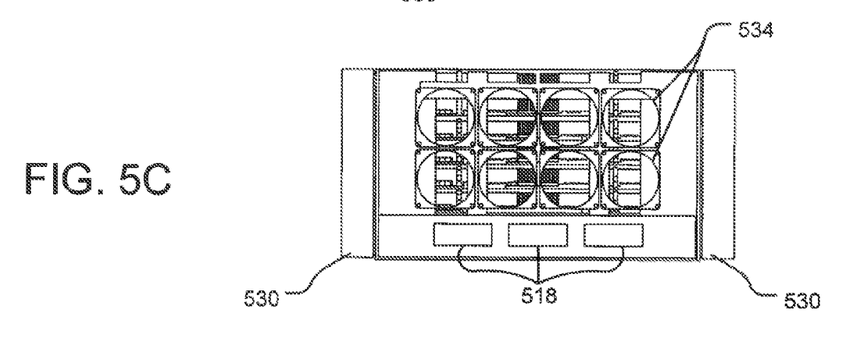
FIG. 5C illustrates an example rear view of an assembled third chassis.

FIG. 5A illustrates an example exploded perspective view of a third chassis 500. FIG. 5B illustrates an example assembled third chassis. FIG. 5C illustrates an example rear view of the third chassis. The third example chassis is applicable to an open compute application environment—which could include various designs intended for ease of use and adoptability. This implementation uses a rack (not shown) which is wider than a 19-inch, EIA standard. The chassis 500 is approximately 6 U high, and includes an open compute rack (About 537 mm). It is powered by a rack-based power system distributing 12V busbar connectors to each enclosure via rear mounted busbars, and is intended for servicing from the front of the rack, although other configurations are possible.

As shown in FIG. 5A, the front enclosure base 502 has a front end 506 taller than the rear end 508, in a step formation. This implementation includes a front enclosure base 502 with added air venting holes (e.g., air vent 524) together with left and right side covers 530, to create an enclosure to suit the increased width of the open compute rack.

Airflow generating means provided within the front enclosure base 502 generates a horizontal airflow so that, when the tray modules (not shown) are received in the front enclosure base 502, the trays including a plurality of storage devices are cooled by the passing horizontal airflow, and vented via the airflow inlet or vent 524 of the front enclosure 502. The airflow generating means is in the rear sub-assembly of the chassis 500, and attached to front enclosure base 502. Side covers 530 are attached to the front enclosure base 502. Airflow cools any interface silicon on the tray interface PCB 522 (shown in FIG. 5B). Controllers placed in the side covers are cooled by the same airflow generating means as the rest of the enclosure system, however, air exits the controller through a top vent (not shown) close to its connector system and enters the chassis 500 via vent 524. From there the airflow is combined with airflow from over the tray modules 504 (shown in FIG. 5B) and passes into the system airflow generating means and out to the rear of the enclosure system.

The use of such a system enables a large number of disk drives to be housed within each tray, while enabling easy access to individual drives should one need servicing or changing. For example, in one implementation, the tray modules hold about 16 data storage drives in a largest-side down orientation and the front enclosure base secures about 8 tray modules.

The implementation of the front enclosure base 502 is configured to have the airflow vent 524 near a back end 508. However, alternatively, such airflow vents 524 may be located at alternative locations along the length of the front enclosure base 502.

The side covers 530 and air venting 524 allow controllers, which would otherwise be rear mounted to be moved to the front of the enclosure, thus adhering to the front servicing requirement. In this implementation, a slightly lengthened version of form factor controllers can be used to provide a high performance compute environment for the enclosure system. The additional venting allows airflow through the chassis 500, exiting via the top vent into the enclosure at the rear of the tray modules 504, close to the midplanes.

The enclosure in this implementation can accommodate dual proprietary extended form factor I/O modules at the sides in the front, busbar connections 518 to rack power and cooling in the rear, and eight multiple function tray modules 504 (e.g., Storage, Flash, Controller, Microserver, etc). Cooling modules and busbar power connections 518 fit within the rear sub-chassis assembly. The top cover 528 and rear extension cover 526 connect to the front enclosure base 502 to provide a contiguous chassis structure. As FIG. 5C shows the chassis assembled from a rear view, trays, midplanes and a busbar are visible through the fans 534. The fan blades are not shown.

Figure 6:
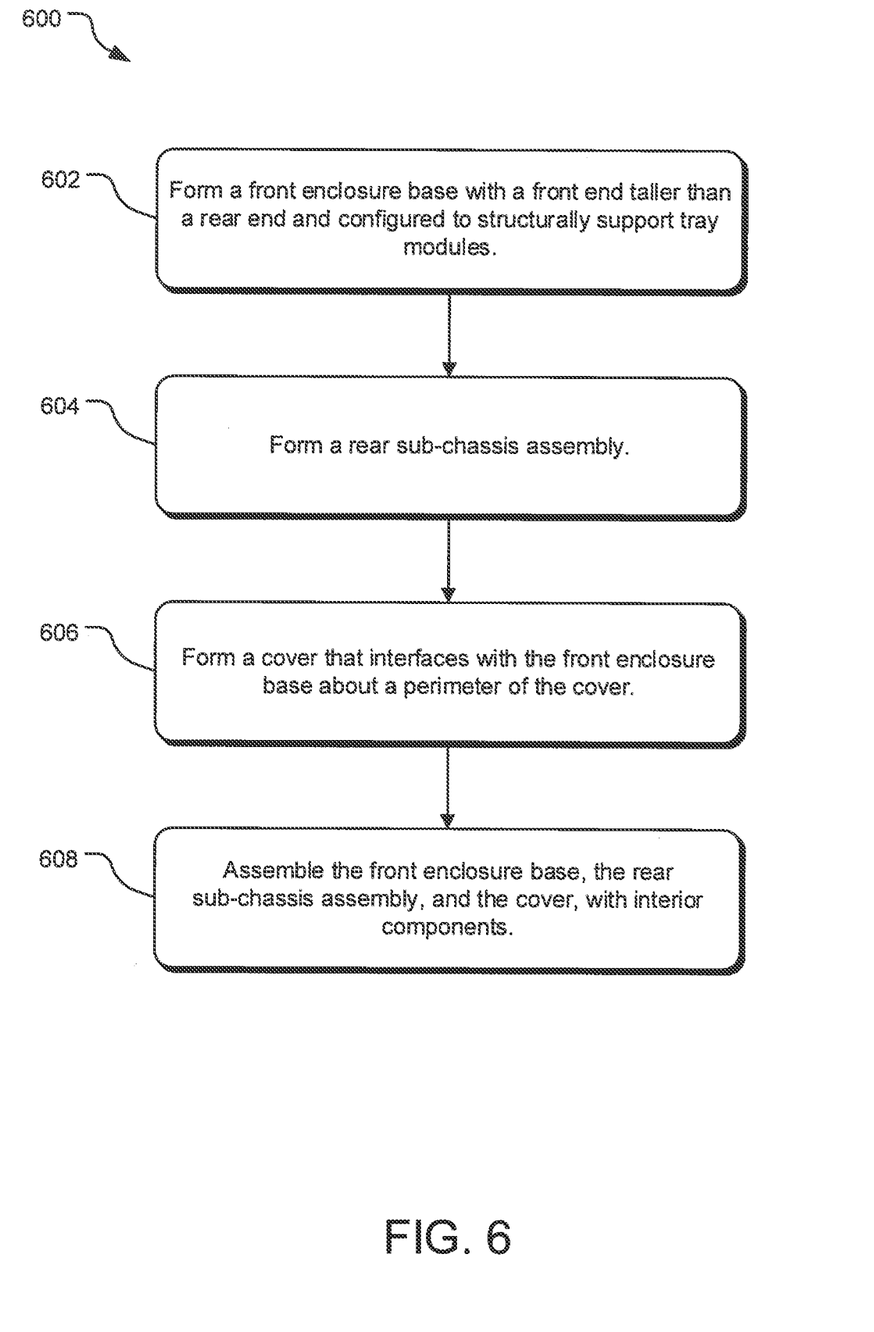
FIG. 6 illustrates example operations for an enclosure system.

FIG. 6 illustrates example operations 600 for manufacturing an enclosure system. A first forming operation 602 forms a front enclosure base configured to secure tray modules (e.g., disk drives, data processing housing, data storage or data switching elements, and combinations of these devices). Each of the tray modules comprises a PCB to connect electronic components. The tray modules are connected at a rear end to a connectivity midplane.

The front enclosure base has a front end taller than the rear end. The front end is configured to structurally support the modules. The rear end allows connecting rear faces of the tray modules to the connectivity midplane.

A second forming operation 604 forms a rear sub-chassis assembly. The rear sub-chassis assembly is configured to connect to one end of the front enclosure base. The rear sub-chassis assembly houses a controller, power supplies/battery modules, fan modules and a fan control PCB.

A third forming operation 606 forms a cover that interfaces with the front enclosure base about a perimeter of the cover. In other implementations, additional components can be added into the enclosure system. For example, another forming operation may form an airflow vent in the side of the front enclosure base for passage of air to cool the components in the enclosure system. In another implementation, an additional forming operation can form a rear extension cover.

In a final assembling operation 608, all of the components formed in operations 602 through 606, the front enclosure base, the rear sub-chassis assembly, and the cover are assembled together with interior components of the enclosure system. The interior components include a tray system, which can include tray modules. In one implementation, the front end base includes a rack or rail runners for receiving the tray modules. The interior components can also include midplane(s), power, and cooling components, as described in these Detailed Descriptions.

The logical operations making up the embodiments of the invention described herein are referred to variously as operations, steps, objects, or modules. Furthermore, it should be understood that logical operations may be performed in any order, adding or omitting operations as desired, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A system comprising:
    a configurable front enclosure base configured to secure enclosure variants, the enclosure variants including a plurality of tray modules, each of the plurality of tray modules comprising a printed circuit board to connect a plurality of electronic components and being connected at a rear end to a connectivity midplane, the connectivity midplane including a power midplane and dual signal circuitry including left-hand signal circuitry and right-hand signal circuitry;
    the configurable front enclosure base having an airflow vent in at least one side of the configurable front enclosure base, a front end taller than the rear end such that the front end is configured to structurally support the plurality of tray modules and the rear end allows connecting rear faces of each of the plurality of tray modules to the connectivity midplane, and the tray modules slideably connected to the configurable front enclosure base on rail runners located on an interior side of the configurable front enclosure base; and
    a rear sub-chassis assembly configured to connect to one end of the configurable front enclosure base.

2. The system of claim 1, further comprising a cover that interfaces with the configurable front enclosure base about a perimeter of the cover.

3. The system of claim 1, wherein the tray modules are 2.5 or 3.5-inch data storage drive trays.

4. The system of claim 1, further comprising a rear extension cover.

5. The system of claim 1, further comprising a chassis about 900 mm or 1100 mm long.

6. The system of claim 1, wherein the tray modules hold about 16 data storage drives in a largest-side down orientation and the configurable front enclosure base secures about 8 tray modules.

7. The system of claim 1, further comprising a chassis 6 U high.

8. A method comprising:
    forming a configurable front enclosure base configured to secure enclosure variants for different types of data storage drives, the enclosure variants including a plurality of tray modules, each of the plurality of tray modules comprising a printed circuit board to connect a plurality of electronic components and being connected at a rear end to a connectivity midplane, the connectivity midplane including a power midplane and dual signal circuitry including left-hand signal circuitry and right-hand signal circuitry,
    the configurable front enclosure base having a front end configured to structurally support the plurality of tray modules and the rear end allows connecting rear faces of each of the plurality of tray modules to the connectivity midplane.

9. The method of claim 8, further comprising forming a rear sub-chassis configured to connect to one end of the configurable front enclosure base.

10. The method of claim 8, further comprising forming a cover that interfaces with the configurable front enclosure base about a perimeter of the cover.

11. The method of claim 8, wherein forming the configurable front enclosure base further includes forming an airflow vent in at least one the side of the configurable front enclosure base.

12. The method of claim 11, further comprising forming a rear extension cover.

13. A storage system, comprising:
a plurality of data storage drives; and
a configurable front enclosure base configured to house tray modules of different dimensions and secure enclosure variants, the enclosure variants including one or more printed circuit boards configured to connect one or more of the data storage drives to a plurality of electronic components and connected at their rear ends to a connectivity midplane, the connectivity midplane including a power midplane and dual signal circuitry including left-hand and right-hand signal circuitries,
the configurable front enclosure base having a front end taller than a rear end such that the front end is configured to structurally support the plurality of printed circuit boards and the rear end allows connecting rear faces of each of the plurality of printed circuit boards to the connectivity midplane.

14. The storage system of claim 13, further comprising a rear sub-chassis assembly housing a controller, power supplies, fan modules, and a fan control printed circuit board, the rear sub-chassis assembly configured to connect to one end of the configurable front enclosure base.

15. The storage system of claim 13, further comprising a cover that interfaces with the configurable front enclosure base about a perimeter of the configurable front enclosure base, the cover having a rear end taller than the front end.

16. The storage system of claim 14, further comprising a rear extension cover configured to connect to the rear sub-chassis assembly.

17. The storage system of claim 14, further comprising an airflow vent in at least one side of the configurable front enclosure base.

18. The system of claim 1, wherein the configurable front enclosure base is configured to house tray modules of different dimensions.

19. The storage system of claim 14, further comprising a horizontal airflow generating means in the rear sub-chassis assembly configured to provide horizontal airflow to cool tray modules including a plurality of storage devices.

* * * * *